No. 703,223. Patented June 24, 1902.
L. ATWOOD.
FISHING REEL.
(Application filed July 16, 1901.)
(No Model.)
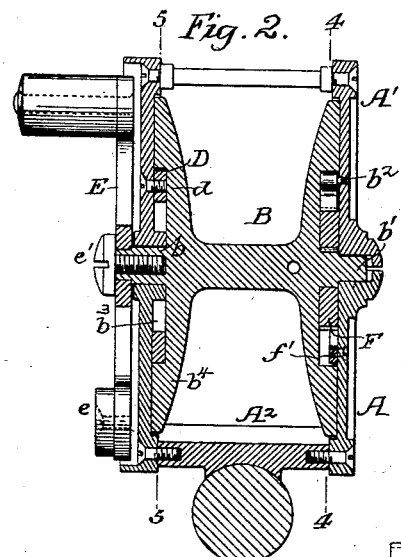
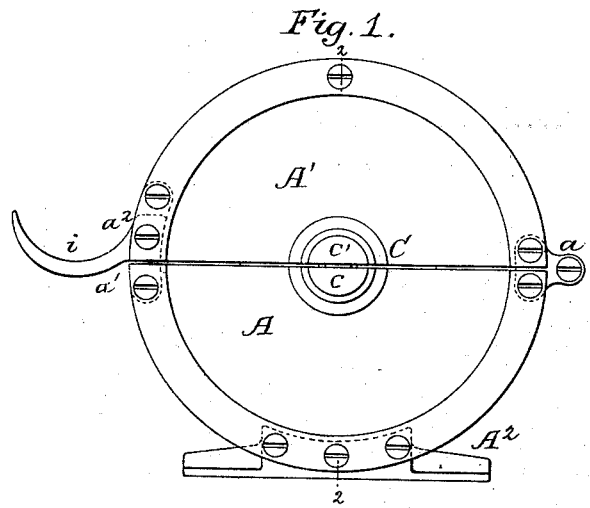
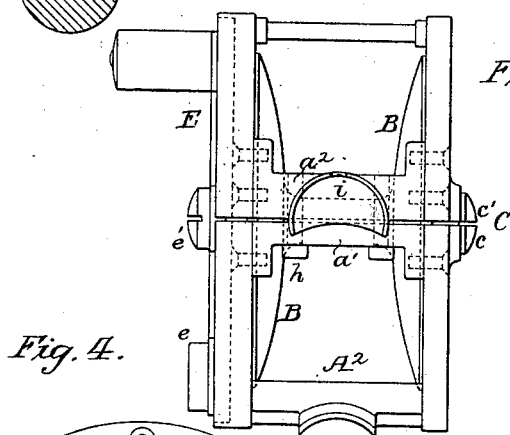
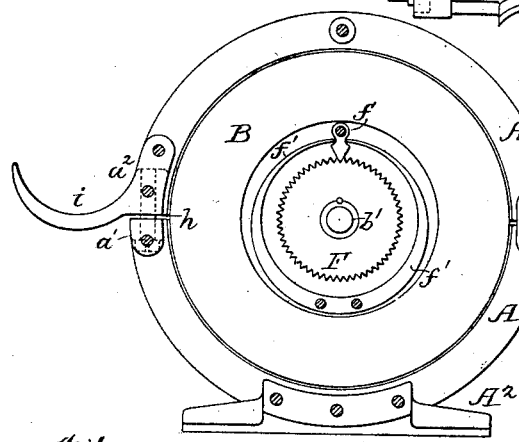
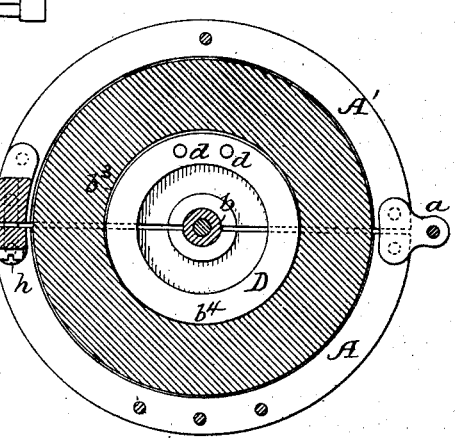
Witnesses:
Hamilton D. Turner
Wm. A. Barr
Inventor:
Leonard Atwood
by his Attorneys
Howson & Howson

UNITED STATES PATENT OFFICE.

LEONARD ATWOOD, OF PHILADELPHIA, PENNSYLVANIA.

FISHING-REEL.

SPECIFICATION forming part of Letters Patent No. 703,223, dated June 24, 1902.

Application filed July 16, 1901. Serial No. 68,518. (No model.)

*To all whom it may concern:*

Be it known that I, LEONARD ATWOOD, a citizen of the United States, residing in Philadelphia, Pennsylvania, have invented certain Improvements in Fishing-Reels, of which the following is a specification.

The object of my invention is to so construct a fishing-reel that the line will be entirely under the control of the fisherman at all times, and the tension on the line can be regulated according to the size and character of the fish.

In the accompanying drawings, Figure 1 is a side view of my improved reel. Fig. 2 is a sectional view on the line 2 2, Fig. 1. Fig. 3 is an end view. Fig. 4 is a section on the line 4 4, Fig. 2; and Fig. 5 is a section on the line 5 5, Fig. 2.

The case of the reel is made in two sections A A'. The section A is the base and is secured to the rod in any suitable manner and in the present instance has a block $A^2$, which is shaped to fit the rod, as shown in Fig. 2. The section A' is pivoted to the section A at $a$, and on the section A is a cross-bar $a'$, and on the section A' is a cross-bar $a^2$. Headed screws $h$ pass freely through openings in the bar $a'$ and into threaded openings in the bar $a^2$. These screws limit the movement of the section A' on its pivot.

B is the spool of the reel, having trunnions $b\ b'$, mounted in the bearing C, made in two parts $c\ c'$, one part of the bearing being carried by the base-section A of the case and the other by the clamp-section A' of the case. The trunnion $b$ extends through the bearing and is provided with the ordinary handle E, having a counterbalance-weight $e$. This handle is held in place on the trunnion by a screw $e'$.

The flanges of the spool B fit snugly within the casing, as illustrated in Fig. 2, and the spool is recessed at $b^2$ and $b^3$. Within the recess $b^2$ is a ratchet-wheel F, secured to the spool in any suitable manner, and pivoted to the casing is a pawl $f$. The point of this pawl fits between the teeth of the ratchet-wheel and is held in position by a spring $f'$, which keeps sufficient tension on the pawl that the spool cannot be turned in either direction without an effort.

It will be noticed that the ratchet-teeth are so shaped that the pawl will act in either direction. This is a common form of friction device for a fishing-reel, and the spring-pawl mechanism may be modified as desired.

Secured to the movable section A' of the casing is a brake-ring D, which rests in a recess $b^3$ of the spool, and this ring will be forced in contact with the surface $b^4$ of the spool when pressure is applied to the movable section A, so that by regulating the pressure more or less friction can be applied to the spool. The ring is secured to the section A' of the case by screws $d$ or any other suitable fastening.

On the bar $a^2$ of the movable portion A' of the casing is an extension $i$, shaped to receive the thumb of the hand, so that by placing the fingers around the rod and the thumb on the projection $i$ sufficient pressure can be applied through the section A' and its brake-ring to stop the rotation of the reel even when a very heavy fish has been caught, and by regulating the pressure of the thumb upon the section A' more or less tension can be applied to the line.

It will be understood that my invention can be applied to reels in which the handle is geared to the trunnion of the spool and can also be applied to spring-reels, if desired. It will be seen, therefore, by my invention that the line is completely under the control of the fisherman, that the line when the fish is hooked can be allowed to run under the ordinary ratchet friction mechanism, and when it is necessary to place more tension upon the line the fisherman simply places his thumb in the thumb-rest $i$ and by drawing the two parts of the case together forces the friction brake-ring upon the spool, and when necessary this brake-ring may be immediately released and the line either allowed to run or by operating the handle the slack on the line can be taken up by turning the handle in the ordinary manner.

I claim as my invention—

1. The combination in a fishing-reel, of a casing made in two parts hinged together, a spool carried by said casing, means for turning said spool, a friction-brake for governing the rate of turning of the spool, one part of said casing being constructed to act as one of the members of said brake, substantially as described.

2. The combination of a two-part casing, one part being hinged to the other, a spool mounted in the casing, a friction-ring mounted on the movable part of the casing and bearing upon the spool at the will of the operator, substantially as described.

3. The combination in a fishing-reel, of a two-part casing, one part being pivoted to the other, and having bearings, a spool having trunnions mounted in the bearings, said spool having a recess in one side, a friction brake-ring secured to the movable portion of the casing and mounted in the recess in the spool, so that on drawing the movable part of the casing to the fixed part the brake-ring will come into frictional contact with the spool, substantially as described.

4. The combination in a reel, of a casing made in two parts, one pivoted to the other, a thumb-rest on one part by which the movable part can be drawn to the fixed part, bearings in the said case, a spool having trunnions mounted in the bearings, the said spool being recessed at each side, a ratchet-wheel on the spool, a spring-pawl engaging said ratchet-wheel, a brake-ring within the recess on the upper side of the spool, said brake-ring being secured to the movable portion of the casing, substantially as described.

In testimony whereof I have signed my name to this specification in the presence of two subscribing witnesses.

LEONARD ATWOOD.

Witnesses:
 WILL. A. BARR,
 JOS. H. KLEIN.